(12) United States Patent
Barbeau et al.

(10) Patent No.: US 8,548,734 B2
(45) Date of Patent: Oct. 1, 2013

(54) SYSTEM AND METHOD FOR REAL-TIME TRAVEL PATH PREDICTION AND AUTOMATIC INCIDENT ALERTS

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 807 days.

(21) Appl. No.: 11/855,694

(22) Filed: Sep. 14, 2007

(65) Prior Publication Data

US 2010/0070171 A1     Mar. 18, 2010

Related U.S. Application Data

(60) Provisional application No. 60/825,605, filed on Sep. 14, 2006.

(51) Int. Cl.
*G01C 21/34*     (2006.01)

(52) U.S. Cl.
USPC ........... 701/411; 701/423; 701/424; 701/527; 701/410

(58) Field of Classification Search
USPC .................. 701/411, 423, 424, 527
See application file for complete search history.

(56) References Cited

U.S. PATENT DOCUMENTS

| | | | |
|---|---|---|---|
| 2002/0082771 A1* | 6/2002 | Anderson | 701/209 |
| 2003/0014286 A1* | 1/2003 | Cappellini | 705/5 |
| 2005/0206534 A1 | 9/2005 | Yamane et al. | |
| 2006/0173841 A1* | 8/2006 | Bill | 707/6 |

* cited by examiner

*Primary Examiner* — James Trammell
*Assistant Examiner* — Jerrah Edwards
(74) *Attorney, Agent, or Firm* — Molly L. Sauter; Smith & Hopen, P.A.

(57) ABSTRACT

A path prediction method that uses a commuter's travel patterns to predict their route and destination, and transmit road advisories via a GPS-enabled device. Once the user's location data is transmitted via a GPS-enabled device it is then catalogued and stored in a GIS database. The user's current travel path is then compared to their path history and statistics and a destination is determined based on related spatial and time properties. A warning is then automatically delivered to the user if there is an accident along their predicted path, without requiring any request or input form the user.

15 Claims, 16 Drawing Sheets

SYSTEM AND METHOD FOR REAL-TIME TRAVEL PATH PREDICTION AND AUTOMATIC INCIDENT ALERTS

CROSS REFERENCE TO RELATED APPLICATIONS

This application is a Non-Provisional Application of copending U.S. Provisional Application No. 60/825,605, filed Sep. 14, 2006, which is incorporated herein by reference.

STATEMENT OF GOVERNMENT SUPPORT

This invention was made with government support under USF#2117760900 and USF#2117770900 awarded by the Florida Department of Transportation. The government has certain rights in the invention.

FIELD OF INVENTION

This invention relates to the field transportation.

BACKGROUND OF THE INVENTION

Transportation (or Travel) Demand Management (TDM) is a set of strategies that influence the behavior of travelers in order to distribute travel more efficiently. TDM aims to decrease unnecessary travel and time spent in transit. Desired outcomes include a decrease in fuel consumption and reduced stress on transportation infrastructure. These outcomes become more important as dependence on petroleum increases and road systems age. Social outcomes of TDM include decreased "road rage" and driving exhaustion as well as increased leisure time.

A user can ascertain his/her location using a Global Positioning System (GPS)-enabled device. Wireless technology affords mobility to the user, so the user can employ GPS to monitor his own location and report this data to an analytical system while the user is moving. Computer systems can assemble, analyze, and retain data on the current and previous locations. Private and public systems monitor traffic and provide reports on accidents, delays, closures and other delays a commuter may face.

Current traffic accident notification systems are based on static subscription lists that are maintained on a server. A user signs up for road segments for which he/she wishes to receive notifications. The user will then receive notifications for accidents in this area even if their physical location is across the country. Because most people sign up for multiple road segments, users are often inundated with messages that are geographically irrelevant. Also, systems, such as the nationwide 511 system, require that the user 'pull' information from the system by placing a phone call. Other applications exist where the user can navigate to a web page on his/her phone, but this also requires that the user "pull" information from the system. These applications can be cumbersome and time-consuming to use on a regular basis.

SUMMARY OF INVENTION

Recent advances in Global Positioning System (GPS)-enabled mobile device technology provide new opportunities for innovative, real-time, location-aware transportation applications. While methods have been developed to re-route traffic once an accident has occurred, this method forecasts imminent congestion and seamlessly communicates this information to the driver in real-time. This method utilizes real-time GPS data, collected using GPS-enabled mobile devices, such as cell phones and personal digital assistants, to predict a user's intended travel path using the user's historical, recorded travel behavior. A warning is then automatically delivered to the user if there is an accident along his/her predicted path, without requiring any request or input from the user. The use of the device's real-time position eliminates geographically-irrelevant traffic alerts from being delivered, and provides early warnings based on personalized, predicted travel paths which allow the user to take alternate routes and avoid congested areas altogether.

A first embodiment of the invention includes a method of predicting a user's path of travel by establishing a travel profile that includes coordinates related to past trips taken by the user and/or others. The user then uses a GPS enabled device to transmit real-time data related to the movement of the user. The user's predicted path is then generated by comparing the real-time data to the travel profile. Illustrative data stored in the travel profile includes trip start coordinates, trip end coordinates, trip way-point coordinates, travel time, travel start time, travel end time, day of week of travel, travel distance, travel speed, travel purpose, intermediate stops, frequency of travel to a specific location, frequency of motorized travel and frequency of non-motorized travel.

In a preferred embodiment, the method also alerts the user of any obstacle or delay along the predicted path of travel. In this embodiment, an obstacle profile is established which includes coordinates related to real-time obstacles. The predicted path is compared to the obstacle profile and the user is then alerted to any obstacles in the obstacle profile whose coordinates correspond to the predicted path. Illustrative data stored in the obstacle profile includes traffic, accidents, construction, road closures and the like. The coordinates relating to these events can then be stored as delay points, delay polylines and/or delay polygons.

In one embodiment, a trip-polyline is generated for each trip in the travel profile. The data from the mobile device is then used to construct a real-time polyline. The predicted path is generated by comparing the real-time polyline to at least one, but preferably several, trip-polyline in the travel profile. The predicted path is a past trip, stored in the travel profile, when a real-time polyline's coordinates correspond with at least one trip polyline stored in the travel profile. If more than one trip-polyline in the travel profile corresponds with the real-time polyline, then the predicted path is the trip associated with the best matching trip polyline.

If the real-time polyline comprises coordinates that do not correspond with any trip-polyline in the travel profile, the number of coordinates in the real-time polyline that do not correspond with a trip-polyline in the travel profile is determined. A modified real-time polyline is then constructed by removing the oldest non-corresponding coordinate from the real-time polyline. The modified real-time polyline is then compared to at least one trip-polyline stored in the travel profile as discussed above. As with the previous example, the predicted path is a trip stored in the travel profile where the modified real-time polyline's coordinates correspond to at least one trip-polyline stored in the travel profile.

In a preferred embodiment, the inventive method establishes a buffer associated with the trips in the travel profile, which are then stored in the travel profile. The buffer is established by generating a trip-polyline for each trip in the trip profile, as discussed in the previous embodiment, and constructing a polygon by buffering the trip-polyline by a predetermined radius. In this embodiment, the real-time polyline is compared to the buffers in the travel profile. It is also preferred that the real-time polyline is constructed from critical points in the real-time data.

As it can be seen, the method compares the traveler's current real-time path to previously recorded paths for the same user. If a similar path is found, then the un-traveled segment of this similar path becomes the predicted path. In one embodiment, the method is implemented to create a "hands-free" smart traffic notification system. The system knows where the user is and predicts the user's most likely destination, so it only delivers relevant information and does so without any input from the user. In another embodiment, the method of forecasting travel paths can be used at an aggregate level to influence traffic signaling in real-time.

BRIEF DESCRIPTION OF THE DRAWINGS

For a fuller understanding of the invention, reference should be made to the following detailed description, taken in connection with the accompanying drawings, in which:

FIG. 13A is a diagram of an example execution of the path prediction method in which the real-time trip data is contained within a single spatial trip polygon.

FIG. 13B is a diagram of an example execution of the path prediction method in which the real-time trip data partially intersects a single spatial trip polygon.

FIG. 13C is a diagram of an example execution of the path prediction method in which the real-time trip data does not intersects any spatial trip polygons.

FIG. 13D is a diagram of an example execution of the path prediction method in which the real-time trip data intersects multiple spatial trip polygons.

FIG. 13E is a diagram of an example execution of the path prediction method in which the real-time trip data is contained within multiple spatial trip polygons.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Recent advances in GPS-enabled mobile phone technology provide new opportunities for innovative, real-time transportation applications that are based on the real-time location of the user. For traffic information, this means that only relevant traffic information is delivered to the user in a timely manner. Here, the invention includes a method to predict where an individual will travel in real-time based on their past recorded travel behavior and to determine possible delays and relay this information along with an alternative route to the user. This eliminates irrelevant messages and delivers messages that apply only to the user's real-time location and their predicted path. Messages triggered by their predicted path will get to the user in time for them to make a change in their route and avoid accidents or congestion altogether.

Figure 3:
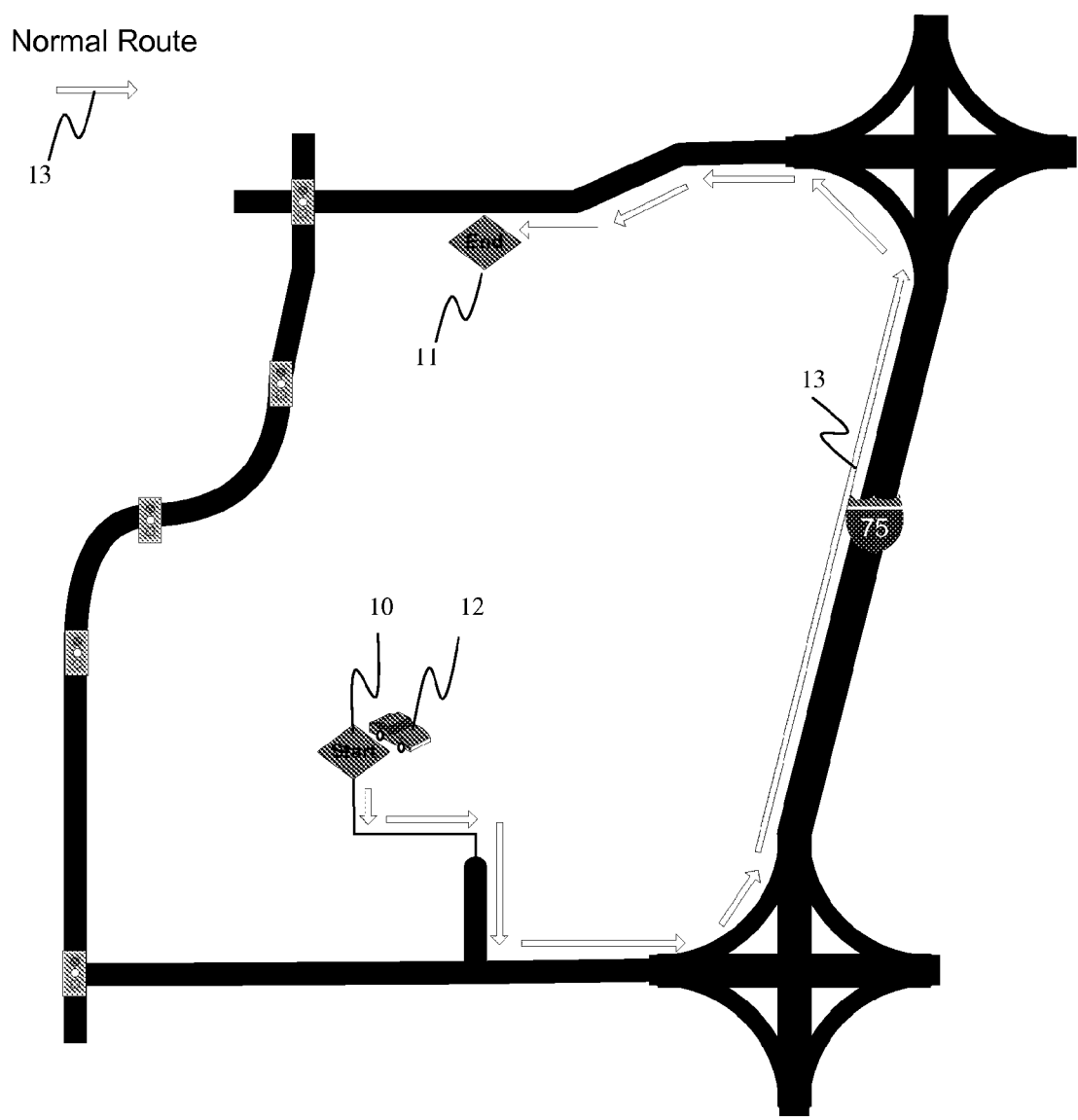
FIG. 3 is a diagrammatic view of the "normal route" a user takes, represented by broken arrows.
Figure 4:
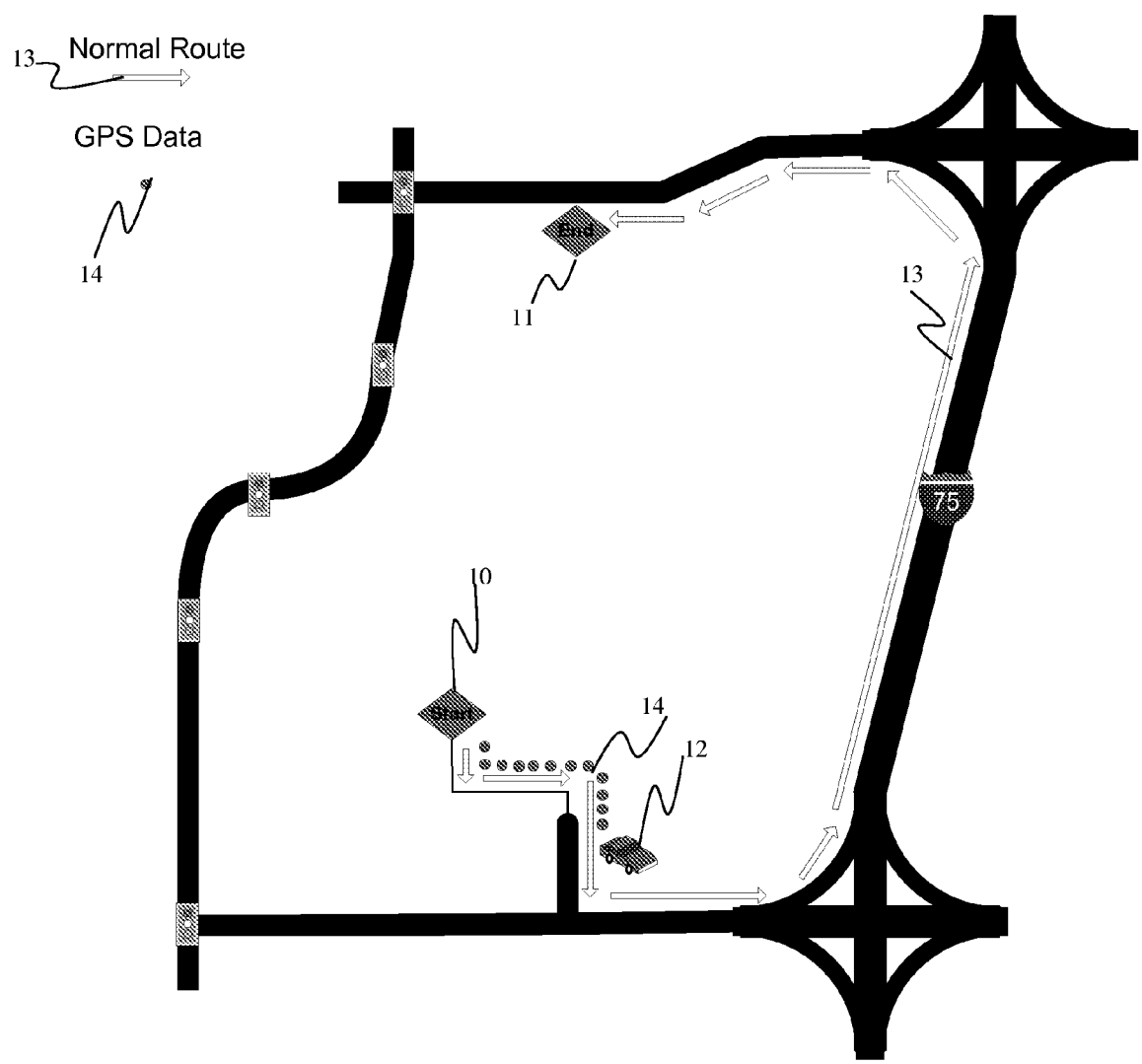
FIG. 4 is a diagrammatic view of the "normal route" a user takes, represented by broken arrows, and the real-time GPS data of the user, represented by dots.
Figure 5:
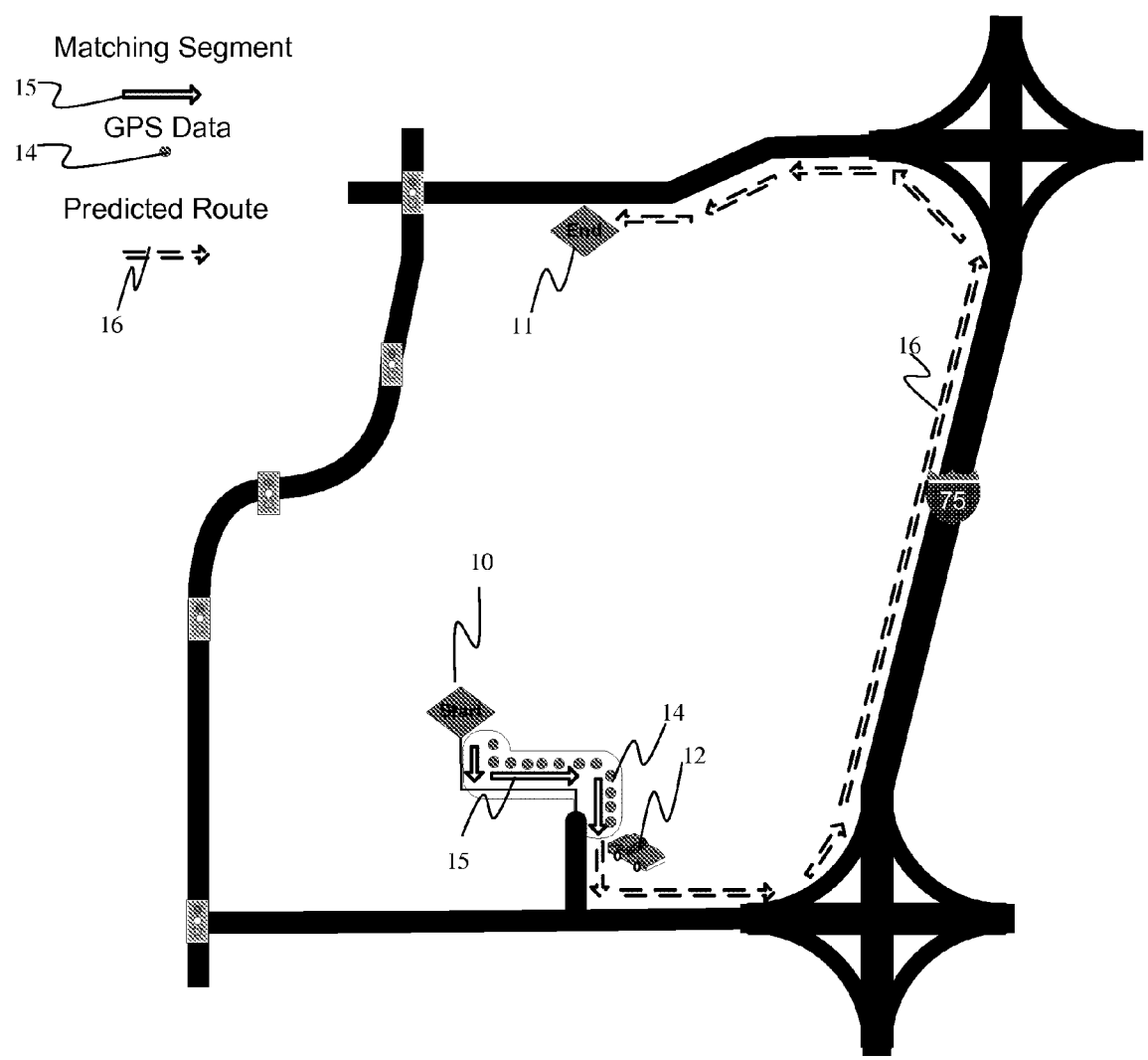
FIG. 5 is a diagrammatic view of the "normal route" a user takes, represented by broken arrows, the real-time GPS data of the user, represented by dots, and the matching segment, represented by solid arrows.
Figure 6:
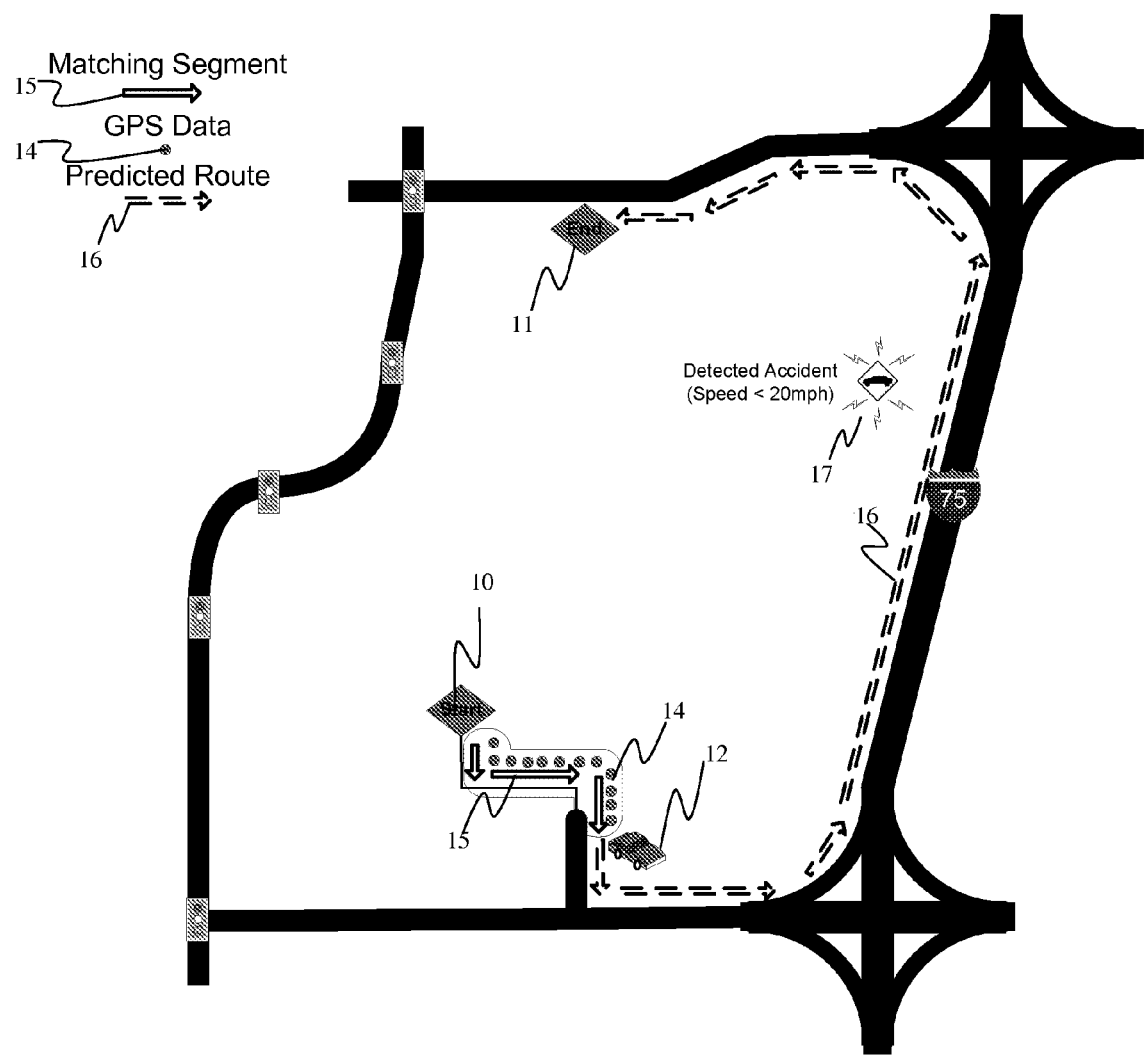
FIG. 6 is a diagrammatic view of the "normal route" a user takes, represented by broken arrows, the real-time GPS data of the user, represented by dots, the matching segment, represented by solid arrows, and a delay in the user's route.
Figure 7:
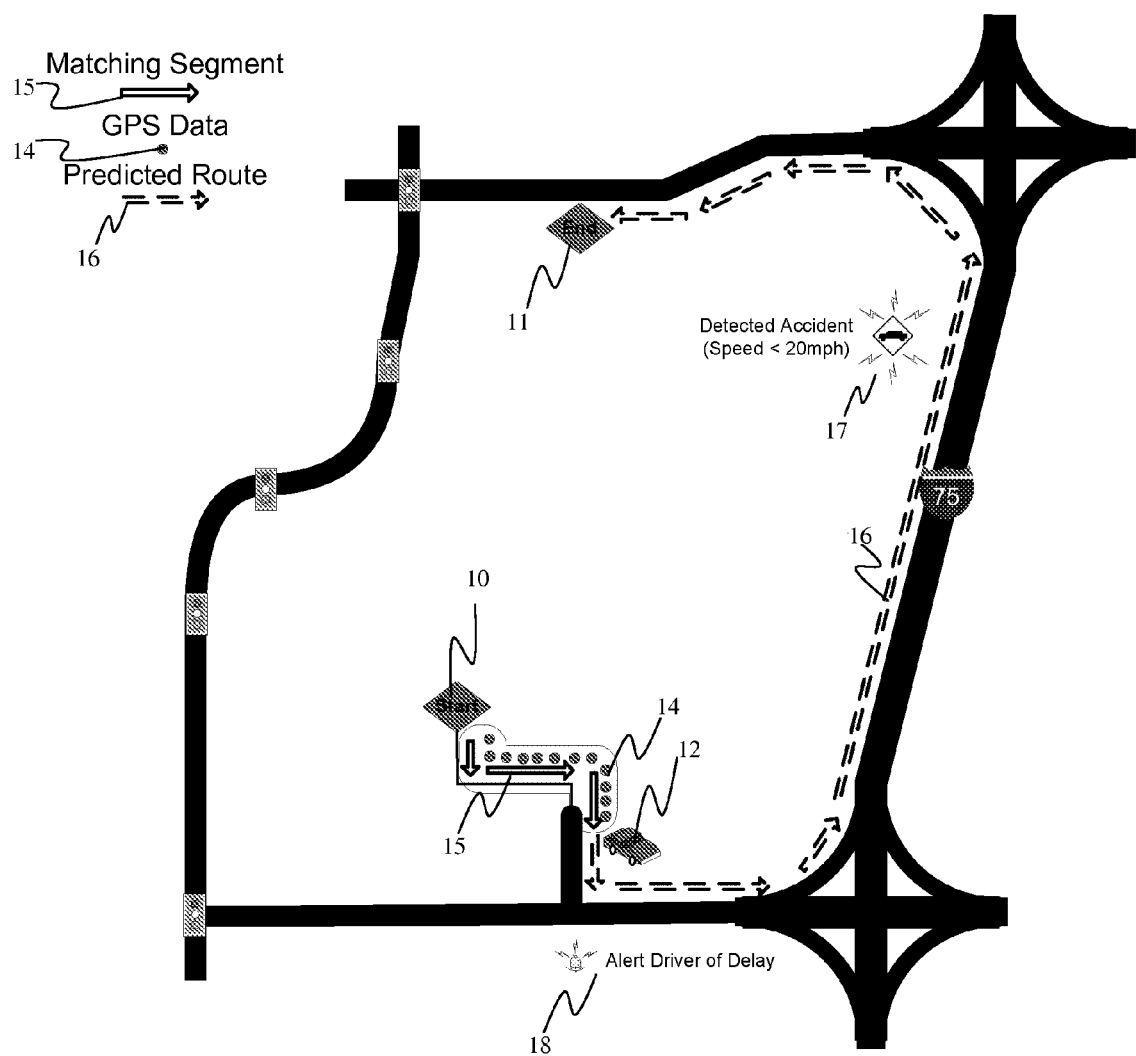
FIG. 7 is a diagrammatic view of the "normal route" a user takes, represented by broken arrows, the real-time GPS data of the user, represented by dots, the matching segment, represented by solid arrows, a delay in the user's route, and the location of the user when the user is alerted of the delay.
Figure 8:
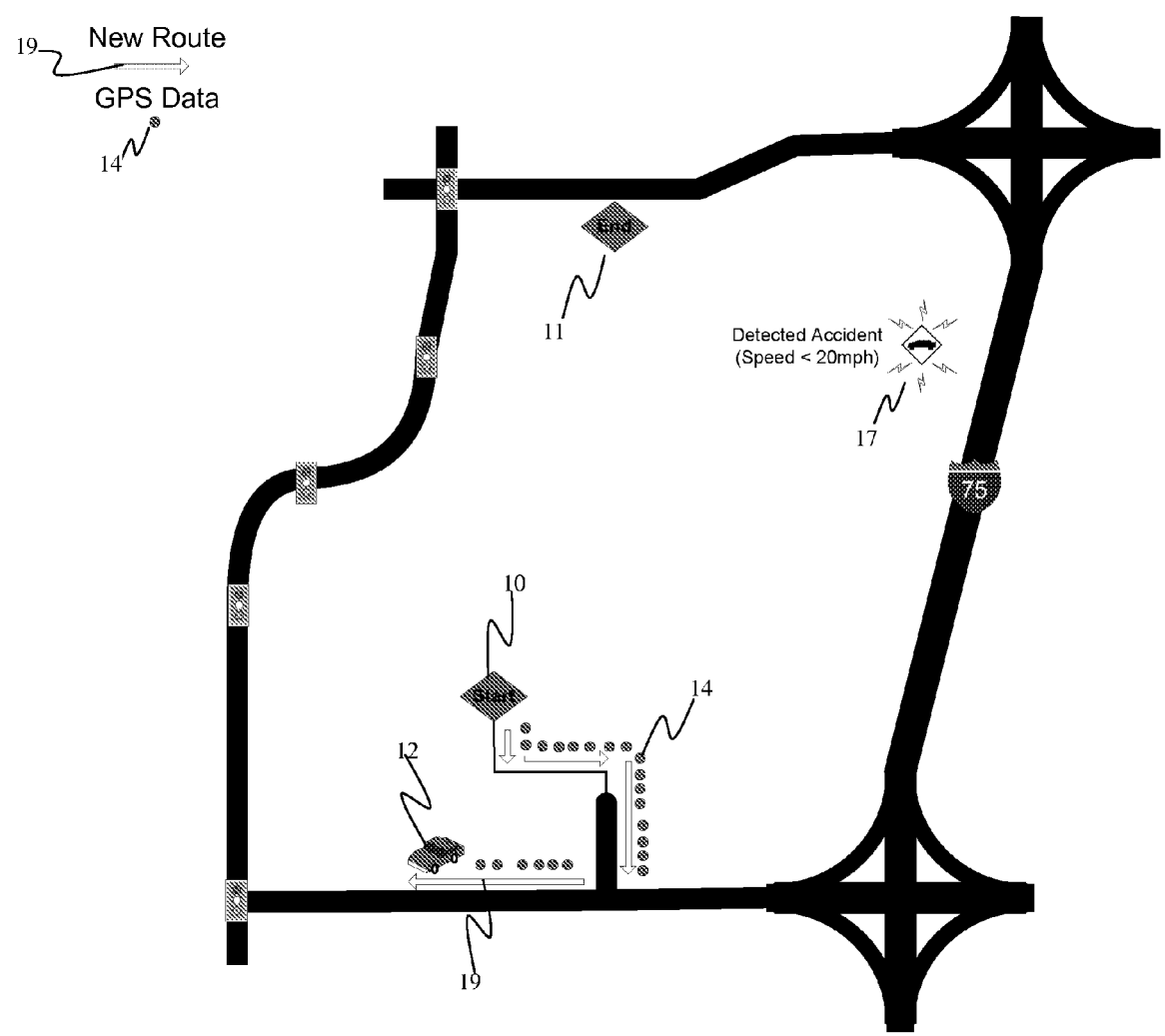
FIG. 8 is a diagrammatic view of the real-time GPS data of the new route of the user, represented by dots, a delay in the user's original route, and the new route.

FIGS. 3 through 8 give a step-by-step illustration of the use of the system. In FIG. 3 the arrows represent the normal route 13 taken by a user 12 from the start point 10 to the end point 11. This normal route 13 is identified using historical travel behavior data of the individual. FIG. 4 again shows the normal route 13, but also includes real-time GPS data 14 of the user as he travel from his start point 10. As shown in FIG. 5, the system uses the real-time GPS data 14 in combination with historical data, here the normal route 13, to match the present route with a route taken previously. It does this by first comparing the GPS data 14 and historical data. The matched segment 15 is the best match that the system could find. The system then uses the matched segment 15 to predict the route 16 the user 12 is taking. When a delay 17, as shown in FIG. 6, occurs along the predicted route 16, the system sends an alert 18 to the user 12, as shown in FIG. 7. As shown in FIG. 8, once the user 12 receives the alert 18, he can change to a new route 19 to avoid the delay 17.

Figure 1:
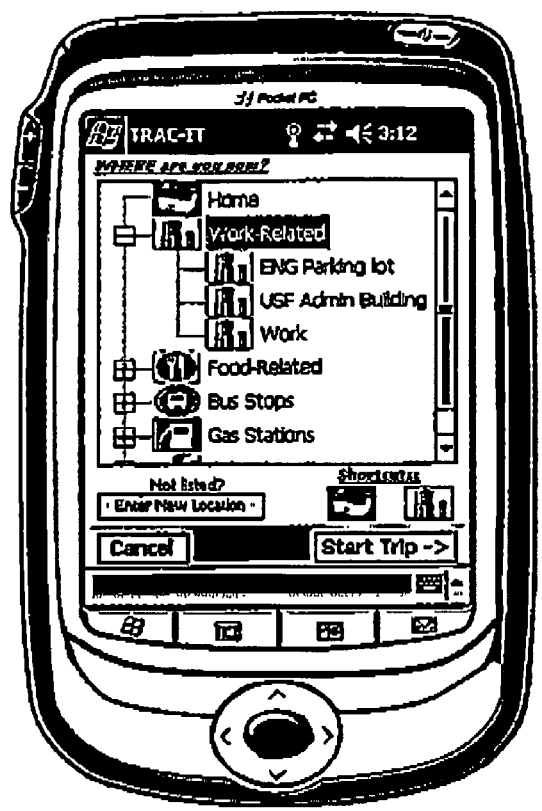
FIG. 1 is a graphical representation of a mobile device having a screen shot of the user interface.

The system records a user's travel behavior through the use of a GPS-enabled mobile device. An example of such a device is illustrated in FIG. 1. As the device collects the data relating to the user's travel, it stores the data, creating an electronic trip 'diary'. The diary includes the travel of a user in a vehicle, on foot, and on bike. The electronic diary replaces paper diaries and automates much of the data collection process. The system collects route information, increases quality, and quantity of collected information. Illustrative data fields include the user's path (which roads are used), travel time, travel distance, travel speed, travel purpose, intermediate stops (e.g., day care), frequency of travel to a specific location, frequency of non-motorized travel, and travel behavior of others in the household.

The method has two main components: Path Predictor and Path Maker. The Path Predictor uses a traveler's past history to determine their future destination. When necessary the method can transition between individual user path history to all path records. This principle allows for a more individualized route prediction approach that is based on the user's specific travel patterns rather than statistics based solely on the general populace or commerce/business popularity. In order to utilize the user's travel history, the Path Maker retrieves and catalogs the user's trip details. Once these statistics and data are archived in a GIS database such as ESRI's ARCSDE™, the Path Predictor can then anticipate the user's travel route based on their past travel patterns and send any warnings related to their path.

Figure 2A:
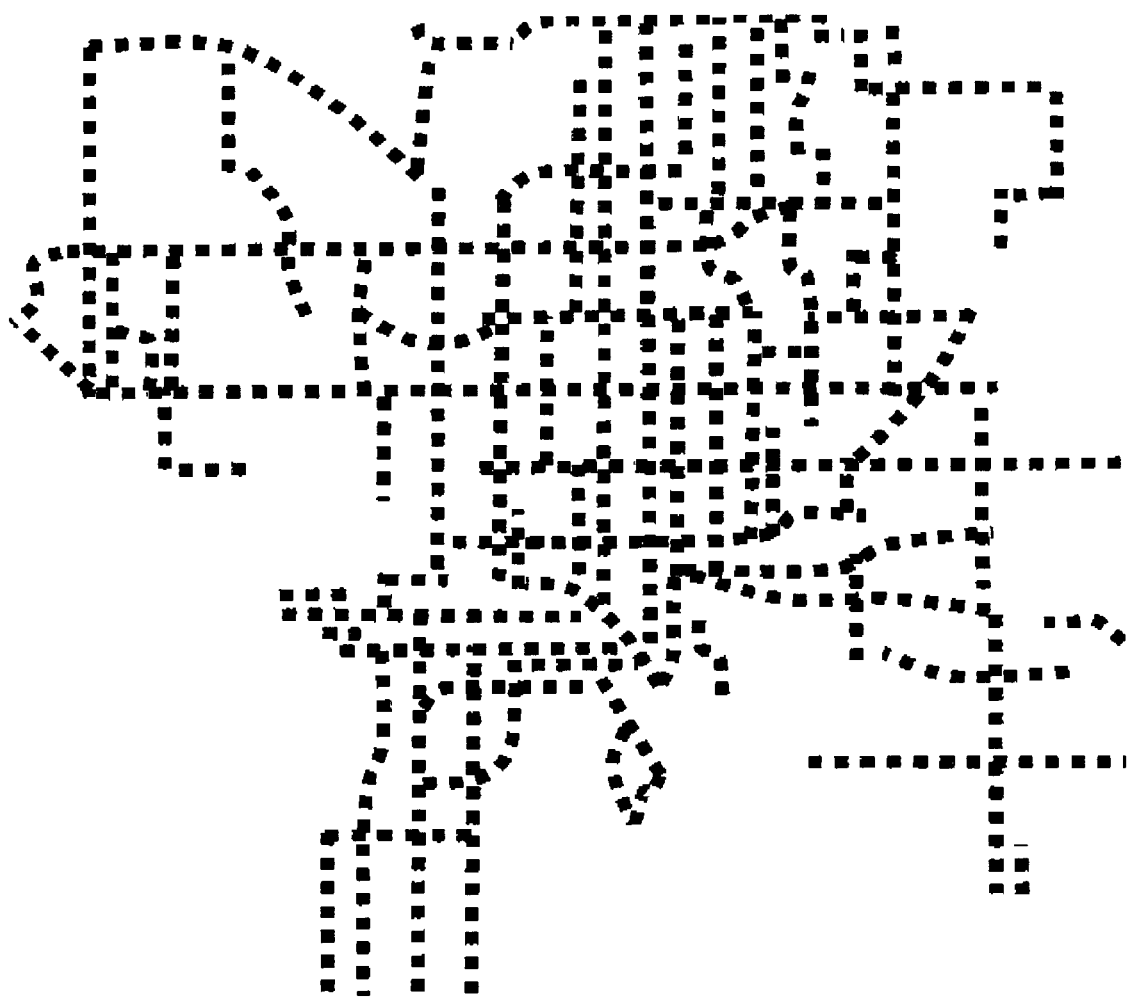
FIG. 2A is a collection of coordinates plotting each of the user's paths.
Figure 2B:
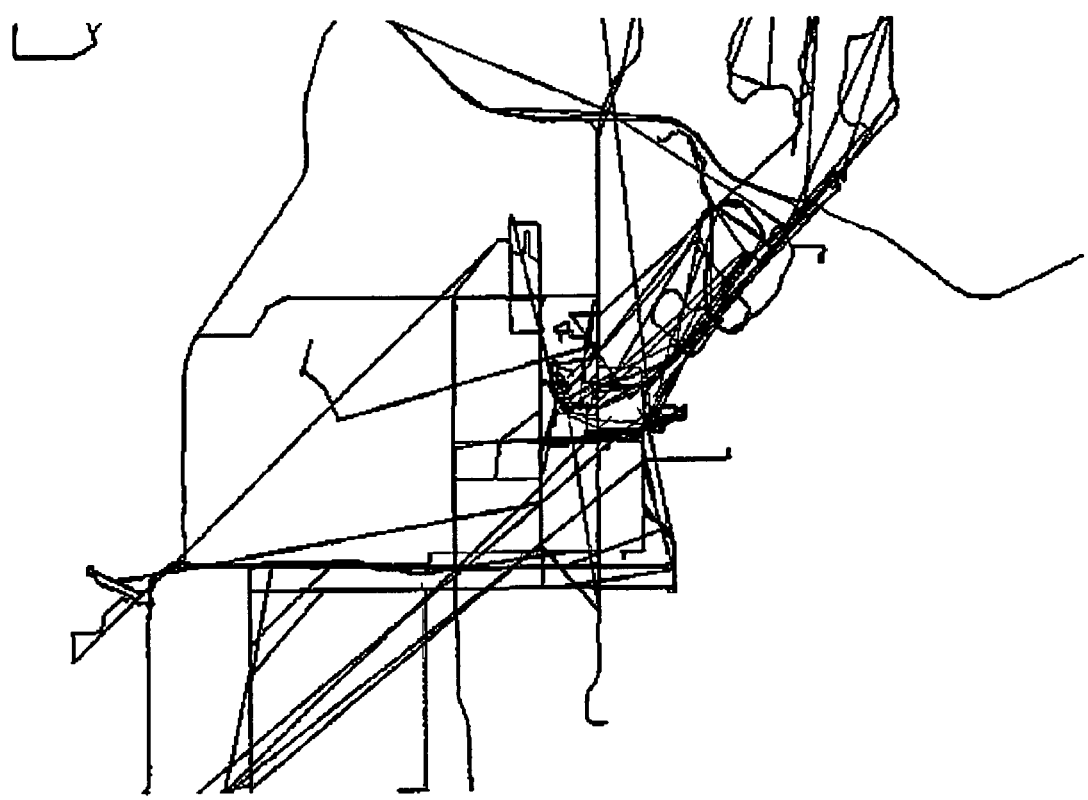
FIG. 2B is a series of polylines created using the coordinates from each of the user's paths.
Figure 9:
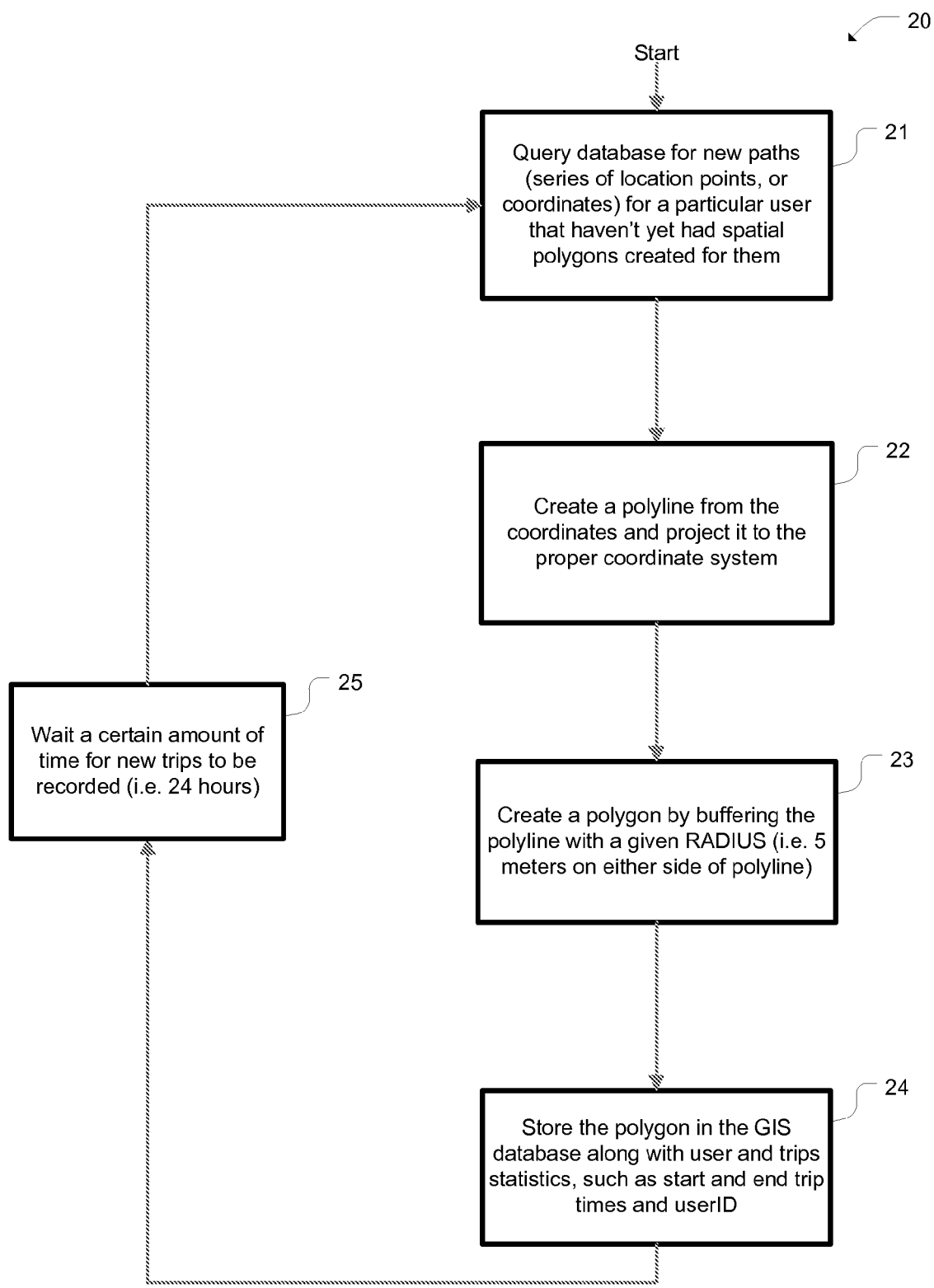
FIG. 9 is a flowchart outlining the steps of the method used to create spatial trip buffers, the polygons created from user trip history.

The Path Maker is responsible for creating and maintaining an archive of user trip records. The Path Maker also prepares for the Path Predictor by creating spatial trip buffers, or polygons, from the recorded user trip history. The Path Maker runs on the server side and the part of the Path Maker that creates the spatial trip buffers runs as a batch periodically to prepare data for the Path Predictor, which runs in real-time. A flowchart of the method used to create buffers is shown in FIG. 9. The Create-Buffers Method 20 queries a SQL database table for trip coordinates categorized by trip and user id, and trip time 21. From the trip coordinates, the application constructs a geographic and geospatially accurate polyline 22. Creation of the polyline can be accomplished with a program such as ESRI's™ Java ArcObjects ARCOBJECTS™ API. A polyline is a set of straight line segments connected to form a larger, perhaps curved, path. Consequently, it requires a minimum of two points to be considered a polyline. A collection of coordinates from a user's traveled paths is shown in FIG. 2A. The polylines created from the coordinates from each path is shown in FIG. 2B.

Figure 2C:
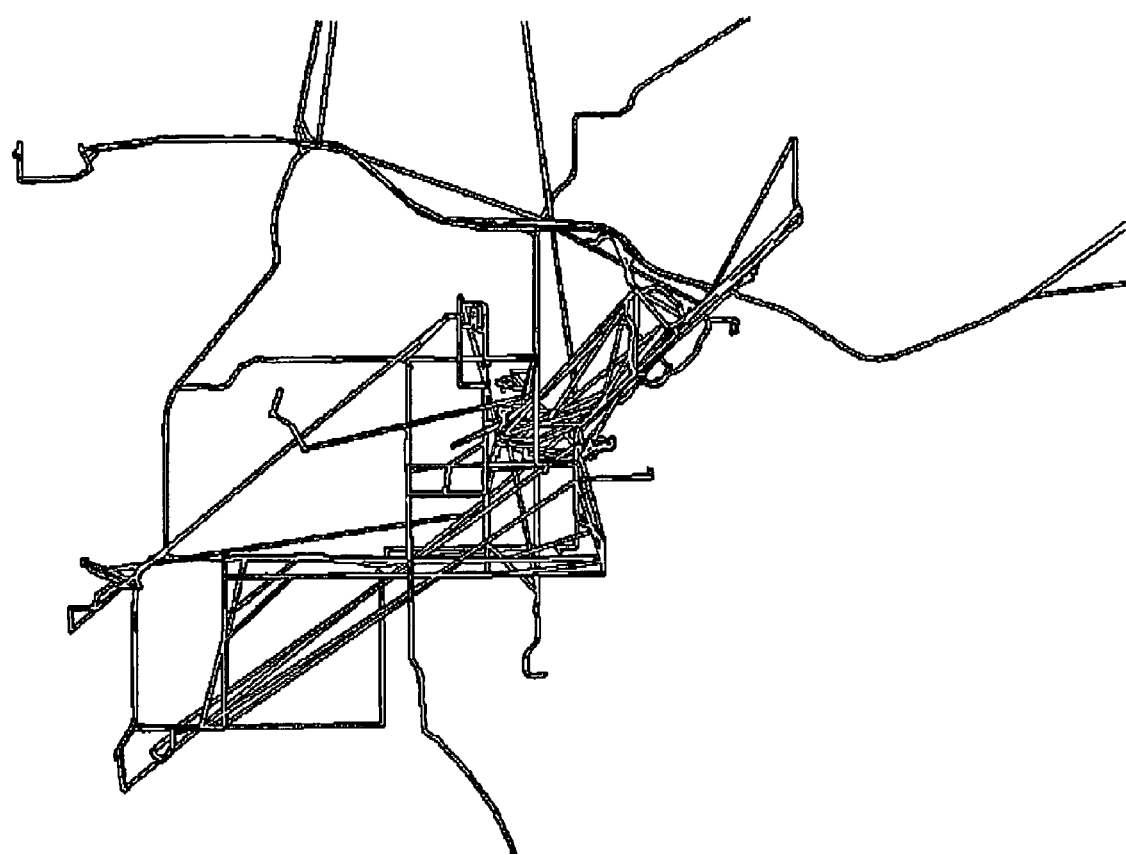
FIG. 2C is a representation of the series of buffers placed around each of the polylines.

ARCOBJECTS™ is a set of GIS software components, namely APIs, which are used for spatial and geographic calculations in many GIS based applications. It provides the developer with objects and methods that perform a multitude of spatial and geographic calculations Once the coordinates have been queried and retrieved and the polyline assembled, the Path Maker buffers the polyline with a one-meter radius to create a polygon 23. FIG. 2C shows the polygons created from the polylines of FIG. 2B. The polygon is then stored in the GIS server along with its statistics, such as the trip and user id, and a timestamp that consists of the trip's start and end time 24. The process then waits a specified period of time for new trips to be recorded 25. Storing polygons is preferred in path prediction because it is easier and more efficient to do spatial calculations with geometries that have area. Once the GIS database is populated with polygon records the Path Predictor can then search it for records to compare against a user's current path.

Figure 10:
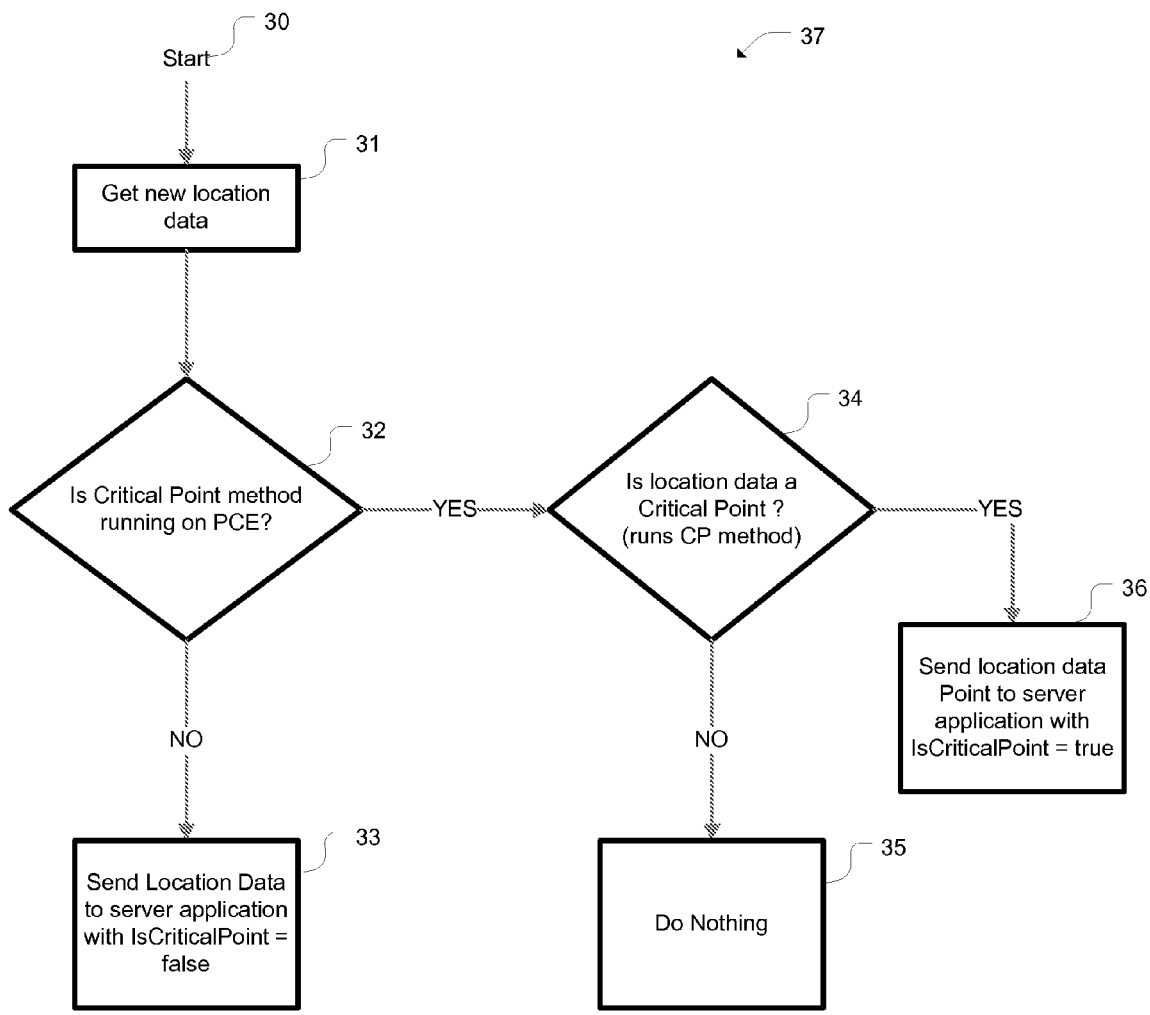
FIG. 10 is a flowchart outlining the client method of the overall path prediction process.
Figure 11:
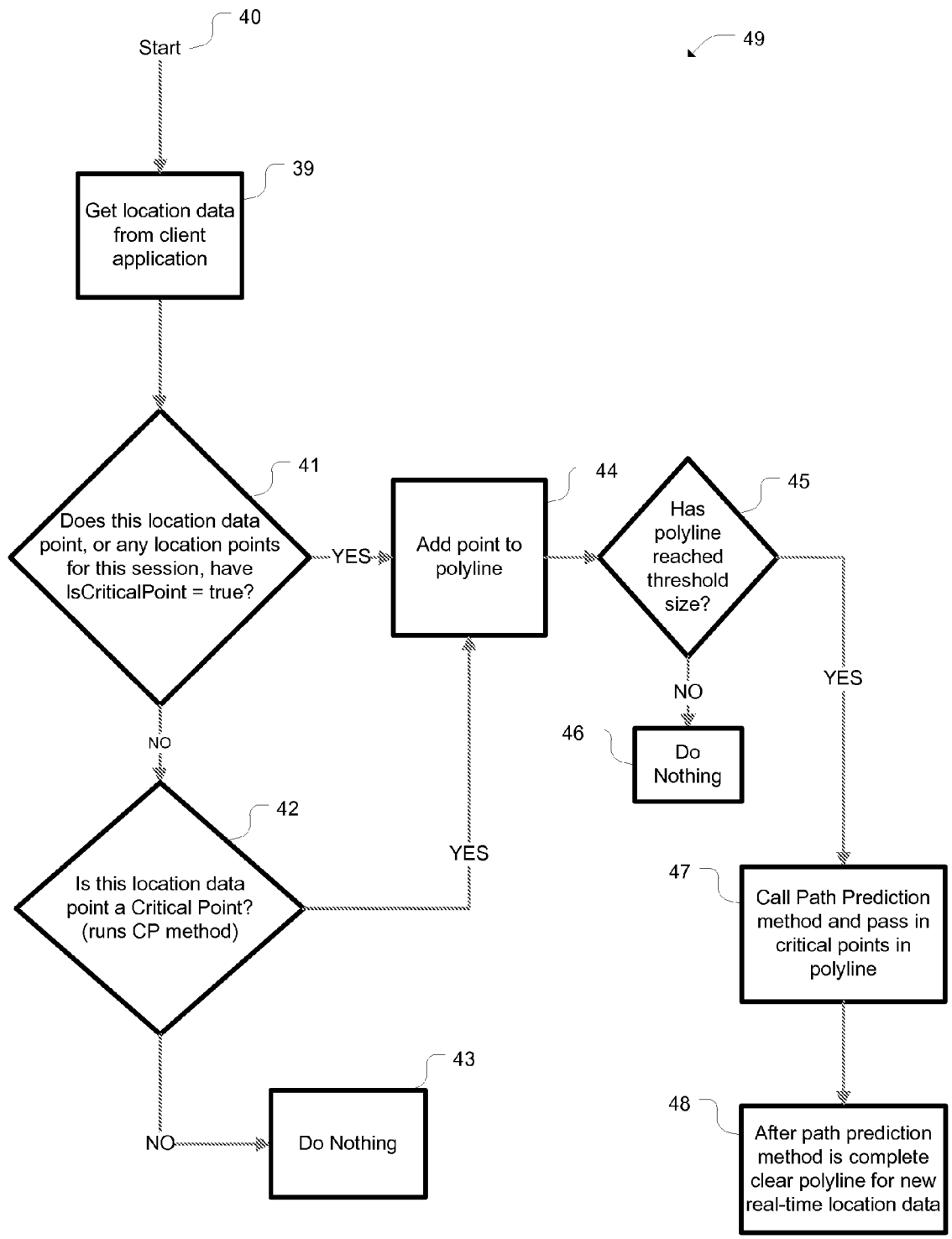
FIG. 11 is a flowchart outlining the server-side method of the overall path prediction method.
Figure 12:
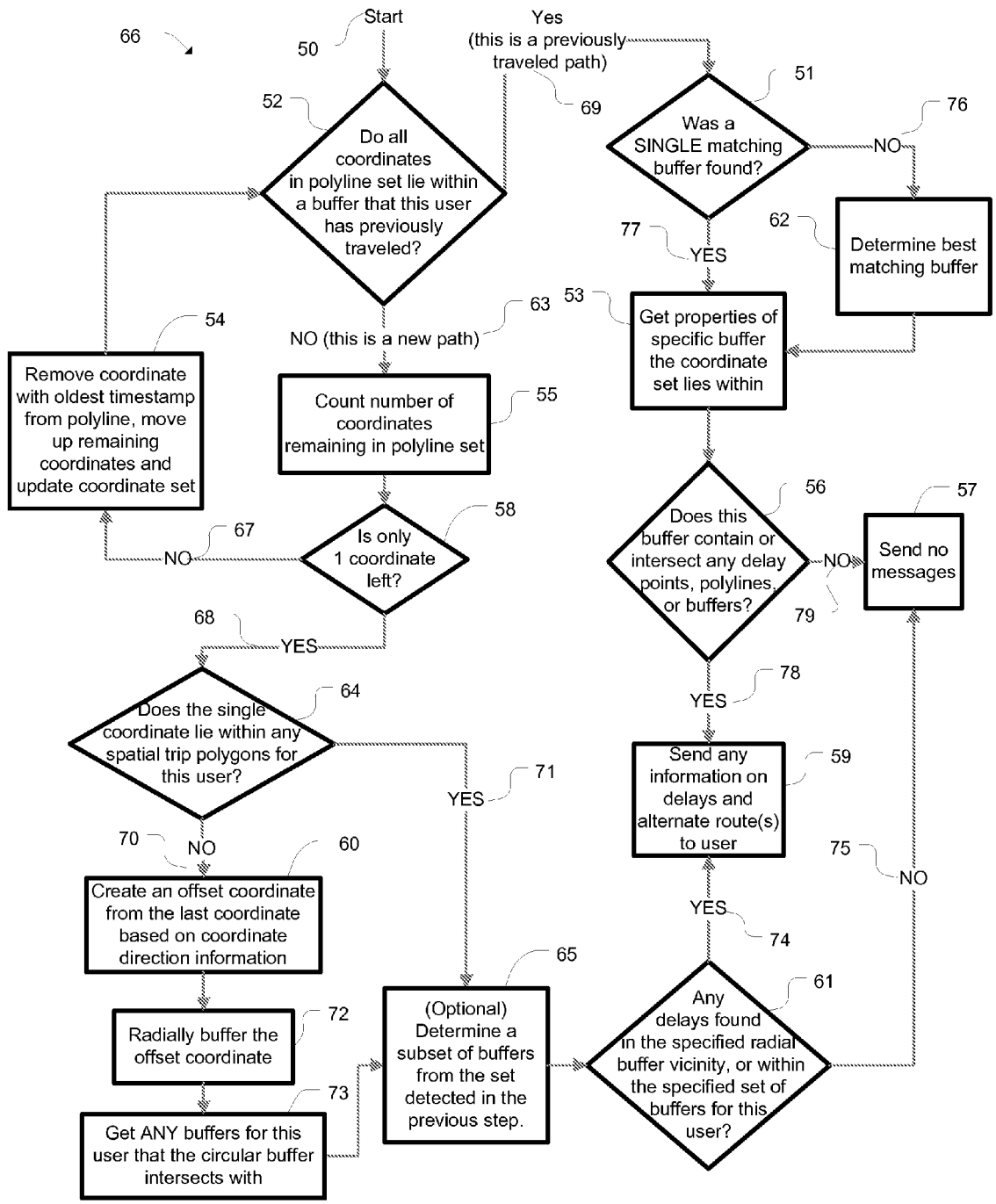
FIG. 12 is a detailed flowchart outlining the methods of path prediction and incident notification.

The Path Predictor has three components: the Client Method 37, illustrated in the flowchart of FIG. 10, the Server-Side Method 49, illustrated in the flowchart of FIG. 11, and the Prediction-Plus-Notification Method 66, illustrated in the flowchart of FIG. 12. The Path Predictor runs in real-time as a mobile device's position is calculated.

The Client Method 37, shown in FIG. 10, can run either on a mobile device or on another position calculating entity (PCE). The PCE can be located on the server side. For location-based service (LBS) applications, the Client Method starts 30 periodically, every time a new position is calculated, and after a session has been established with the server. Once the Client Method is started 30, the new location data is obtained 31. The Client Method 37 then determines if a Critical Point Method is running on the PCE 32. If the Critical Point Method is not running, then the new location data is sent to the Server-Side Method 49 and the location data is identified as not being a critical point (IsCriticalPoint=false) 33. If the Critical Point Method is running, then the Method retrieves from the Critical Point Method whether the location data is a critical point 34. If the location data is a critical point then the new location data is sent to the Server-Side Method 49 and the data is labeled as being a critical point (IsCriticalPoint=true) 36. If the location data is not a critical point, then the Method does nothing 35.

The Server-Side Method 49, shown in FIG. 11, starts 40 each time new position data is obtained by the PCE. Once started the Server-Side Method 49 obtains the location data from the Client Method 39. The Method 49 then determines if any of the location data points have already been labeled as critical points (IsCriticalPoint=true) 41. If none have been labeled critical points (IsCriticalPoint=false), the Method then runs the Critical Point Method to determine if the location data point is a critical point 42. If the location data point is not a critical point, the Method does nothing 43. If the location data point is a critical point (IsCriticalPoint=true), the location data point is added to the polyline 44. The Method 49 then determines whether the polyline has reached its maximum size 45. If not, the Method does nothing and waits for more critical points 46. If the polyline has reached it maximum size, the critical points in the polyline are passed to the Prediction-Plus-Notification Method 66 which is subsequently executed 47. Upon completion of the Prediction-Plus-Notification Method 66, the Server-Side Method 49 clears the polyline to allow for new real-time location data points 48.

The Prediction-Plus-Notification Method 66, shown in the flowchart of FIG. 12, starts 50 when called by the Server-Side Method 49 and takes as input the coordinates from the polyline once the polyline size has reached its threshold value. The Method first determines whether the coordinates are contained in a buffer that the user has previously traveled 52. This is done by comparing the coordinates to the buffers created by the Path Maker Method.

If the coordinates are not contained within a buffer, then this is a newly traveled path 63. The coordinates are then counted 55 and the Method determines the number of coordinates left 58. If there is more than one coordinate 67, the oldest coordinate is removed from the polyline 54. The Method then determines whether the remaining coordinates are contained within a buffer 52. If not 63, then the same process is repeated until the remaining coordinates are contained within a buffer 69 or there is only one coordinate left 68. When there is only one coordinate left 68, the Method determines if the coordinate lies within any of the user's trip buffers 64. If not 70, an offset coordinate is created based on coordinate direction information from the last coordinate 60. The offset coordinate is then radially buffered 72. Any trip buffers that this circular buffer intersects with are then retrieved 73. Then, optionally, a subset of buffers is determined 65. This subset has the highest probability that the user traveling would be traveling based on recorded trip history such as day of the week or time of day. This step could use methods such as Baysian networks or other probabilistic methods. This optional step 65 can also follow if the Method finds that the single coordinates lies within a trip buffer 71. Next, the Method determines whether there are any delays in the radial buffer or within the specified set of buffers for this user 61. If delays are found 74, information on the delay and any alternate route(s) is sent to the user 59. If no delays are found 75, no messages are sent 57.

If the coordinates are contained within a buffer, then this is a previously traveled path 69. When a matching buffer is detected 69, the Method determines the number of matching buffers 51. If more than one buffer is found 76, the best matching buffer is determined 62. Once the best matching buffer is determined, or if only one buffer is found 77 to begin with, the properties of that buffer are obtained 53. Next, the Method determines whether the buffer contains or intersects any delay points, polylines, or buffers 56. If the buffer does 78, then information on the delay and any alternate route(s) is sent to the user 59. If the buffer does not 79, no messages are sent 57.

If multiple buffers are found 76 in the Prediction-Plus-Notification Method 66, the Method refines the results by comparing the traveler's user id to those of the polygons and eliminating any polygons with a different user id. If multiple polygons still remain, the Method then looks at the current time of the trip and compares the "EndDateTime" of the polygon records for trips that concluded within a certain time-threshold. Any trips that deviate from this threshold, such as trips that already ended in comparison to the current time, are eliminated from the result set. If yet more trips remain, the Method does a comparison of the polygon records themselves to determine if they end at the same location. If the destinations of the records are found to be the same, the Method then concludes that the user is headed to this destination. The best-case scenario, but certainly least likely, is that only one record is returned. The worse case scenario is that no polygon records are returned.

If no polygon records are returned, the Method selects from a series of methods not unlike what it does for multiple polygons, to obtain the most likely buffer records. First, the first coordinate in the coordinate set will be eliminated, and the Method will be called again in a recursive fashion until any polygon records are obtained. This is performed, specifically, because it is preferable in a polyline-in-buffer spatial query that the polyline be within the polygon. This situation might occur if the user's current trip begins recording before her/his past trips did, whereby the polyline might be nonadjacent to a polygon record(s). If only one coordinate remains from a result of the recursive method the last coordinate is then used to create a beacon. Specifically, a new coordinate is created by adding an offset in the direction of the heading of the last coordinate to obtain a new point. A circle with a predetermined radius (i.e. ten meters) is then created around this point and an intersection query against the polygons in the GIS database is performed to retrieve any polygon records within the circular vicinity. This situation can occur if a polygon record was never created for a path or if the database is sparsely populated. The procedure is typically performed to give the user immediate feedback about any hazards within their vicinity rather than send them no information at all.

Later, the Method will be called again with a new set of coordinates and the aforementioned procedures will be performed again. This will give the user new and improved updates.

FIGS. 13A through 13E are graphical illustrations of example executions of the Path Prediction Method. In these diagrams the polygon 90 is a spatial trip buffer that was created in the Create-Buffers Method 20 based on a previously recorded trip by this user. In a real situation, the user would have many of these polygons. The five critical points 91 have been recorded by the PCE and have been passed into the Path Prediction Method. The direction of travel 94 is from left to right.

Figure 13A:
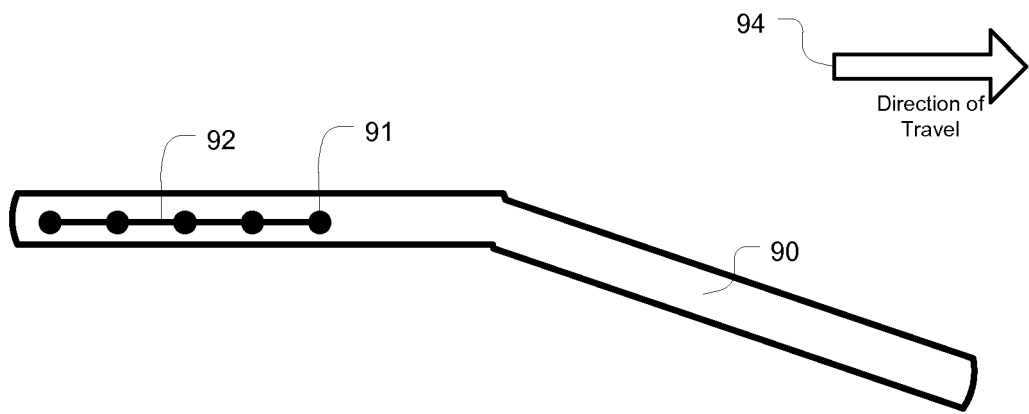
FIGS. 13A through 13E are diagrams of example executions of the path prediction method.

In FIG. 13A the real-time path is contained within a single polygon 90. Therefore, this polygon 90 is used for real-time path prediction. For delay detection, the polygon 90 is checked for intersection with any delay shapes (i.e. points, polylines, or polygons) and if there is an intersection, the user is notified.

Figure 13B:
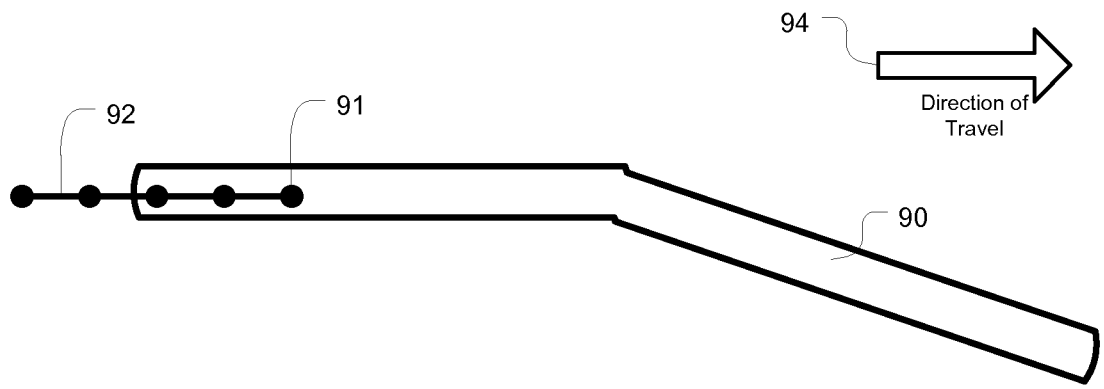

In FIG. 13B the real-time trip data partially intersects a single polygon 90. The first two coordinates did not fall within a trip polygon, so they were removed one-by-one until the entire remaining polyline 92 lied completely within the trip polygon 90. This polygon 90 is then used to predict the users immediate travel path. The Method checks if any delays shapes intersect with this trip buffer, and if so, the system notifies the user.

Figure 13C:
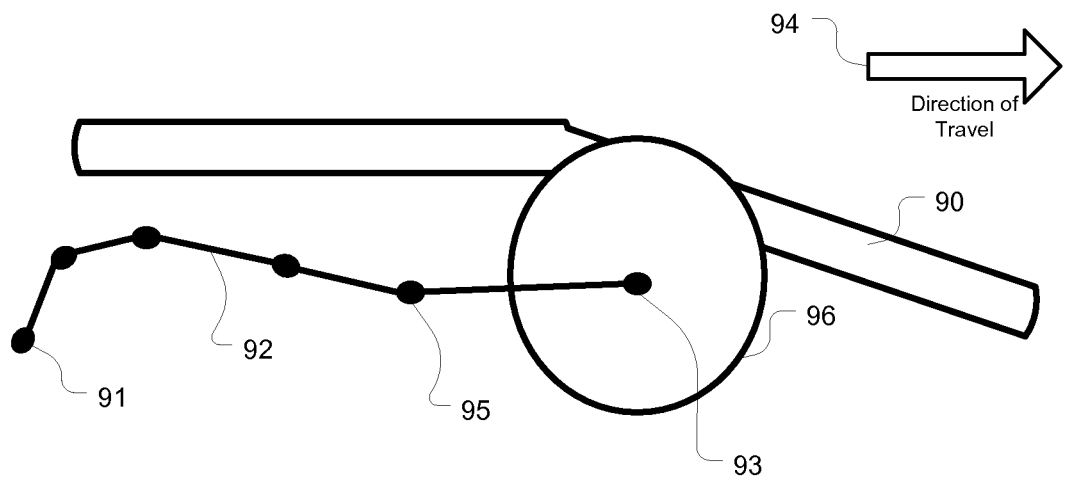

In FIG. 13C, the real-time trip data does not intersect any spatial trip polygons. The first entire trip polyline 92 did not fall within a trip polygon 90 even after the oldest points are removed one-by-one. An offset coordinate 93 was then created based on the direction of travel 94 of the last recorded point 95. A spatial radius buffer 96 is then projected around this offset coordinate 93. In this example, the radius buffer 96 intersects with a trip polygon, so this trip buffer is used to predict the user's immediate path. The Method checks if any delays shapes intersect with this trip buffer, and if so, the system notifies the user.

Figure 13D:
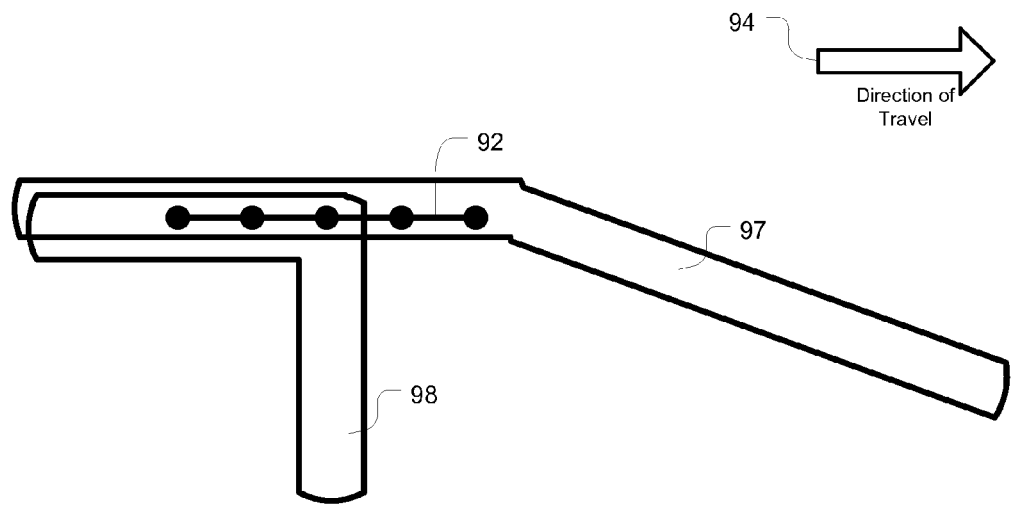

In FIG. 13D the real-time trip data intersects multiple spatial trip polygons. Because the real-time path intersects two polygon, first buffer 97 and second buffer 98, the oldest coordinates are removed one-by-one until the newest location data polyline 92 lies completely within a single polygon, first buffer 97. In this example, the first buffer 97 is used to predict the user's immediate path. The Method then checks if any delays shapes intersect with this trip buffer, and if so, the system notifies the user.

Figure 13E:
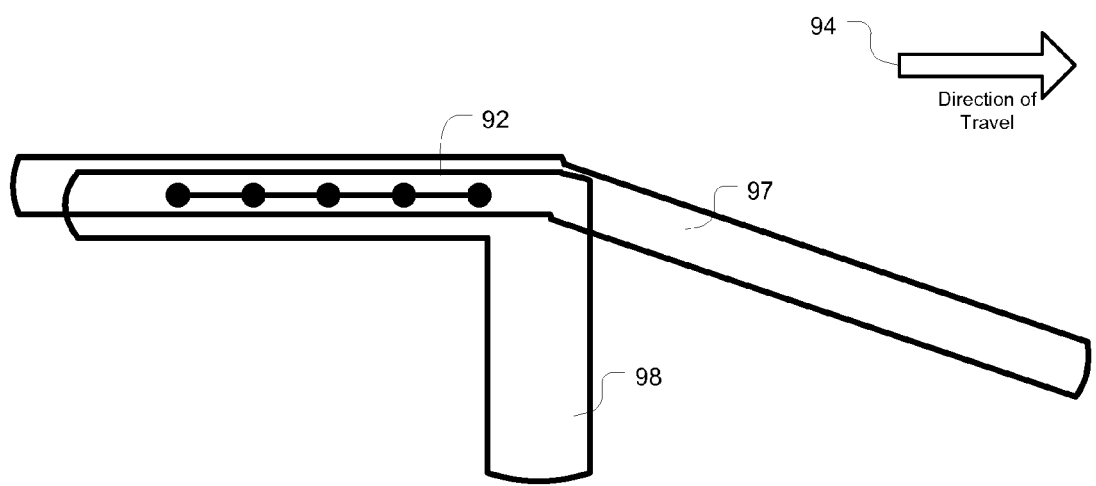

In FIG. 13E the real-time trip data is contained within multiple spatial trip polygons. Because the real-time path is contained within two polygons, first buffer 97 and second buffer 98, probabilistic methods may be used to determine which path the user will most likely take. Schedule data from trip polygons such as trip day of week or time of day may also be used. For incident detection, all spatial trip buffers that the real-time data is contained within are checked for intersection with any delay shapes, and delays are detected, the system notifies the user.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of notifying a user of an obstacle in a predicted path of travel, the method comprising:
   receiving real-time location data for a user from a user's mobile device, the real-time location data comprising a plurality of coordinates representative of a current path of travel by the user;
   receiving a plurality of trip-polylines associated with the user, wherein each of the plurality of trip-polylines represents a previous path of travel by the user;
   comparing the real-time location data to the plurality of trip-polylines to identify a trip-polyline that corresponds with the real-time location data of the user;

responsive to a trip-polyline being identified that corresponds with the real-time location data of the user, determining the identified trip-polyline to be a predicted path of the user; and receiving an obstacle profile comprising coordinates related to at least one real-time obstacle;

determining if the at least one real-time obstacle is within the predicted path of the user by comparing the predicted path of the user to the coordinates of the at least one real-time obstacle; and transmitting a notification to the user's mobile device if the at least one real-time obstacle is within the predicted path of the user;

responsive to a trip-polyline not being identified that corresponds with the real-time location data of the user:

reducing the real-time location data by removing an oldest coordinate of the plurality of coordinates from the real-time location data of the user; and if the reduced real-time location data comprises more than one coordinate;

comparing the reduced real-time location data to the plurality of trip-polylines to identify a trip-polyline that corresponds with the reduced real-time location data of the user responsive to a trip-polyline being identified that corresponds with the reduced real-time location data of the user, determining the identified trip-polyline to be a predicted path of the user; and receiving an obstacle profile comprising coordinates related to at least one real-time obstacle;

determining if the at least one real-time obstacle is within the predicted path of the user by comparing the predicted path of the user to the coordinates of the at least one real-time obstacle; and transmitting a notification to the user's mobile device if the at least one real-time obstacle is within the predicted path of the user;

responsive to a trip-polyline not being identified that corresponds with the reduced real-time location data of the user:

further reducing the real-time location data by removing a next oldest coordinate of the plurality of coordinates from the real-time location data of the user and if the further reduced real-time location data comprises more than one coordinate repeating the step of comparing the reduced real-time location data of the user to the plurality of trip-polylines;

or, if the reduced real-time location data comprises a single coordinate;

determining a direction of travel of the user;

identifying an offset coordinate at a predetermined distance from the single coordinate in the direction of travel of the user;

radially buffering the offset coordinate at a predetermined radius to create a radial beacon;

comparing the radial beacon to the plurality of trip-polylines to identify a trip-polyline that corresponds with the radial beacon;

responsive to a trip-polyline being identified that corresponds with the radial beacon, determining the identified trip-polyline to be a predicted path of the user; and receiving an obstacle profile comprising coordinates related to at least one real-time obstacle;

determining if the at least one real-time obstacle is within the predicted path of the user by comparing the predicted path of the user to the coordinates of the at least one real-time obstacle; and transmitting a notification to the user's mobile device if the at least one real-time obstacle is within the predicted path of the user.

2. The method of claim 1 wherein the obstacle is selected from the group consisting of delay points, delay polylines and delay polygons.

3. The method of claim 1, wherein the real-time location data is represented by a real-time polyline constructed using the plurality of coordinates in the real-time location data.

4. The method of claim 1, further comprising:
responsive to identifying a plurality of trip-polylines that correspond with the real-time location data of user;
determining the predicted path of the user to be the best matching trip-polyline of the plurality of trip-polylines that correspond with the real-time location data of the user.

5. The method of claim 1, further comprising:
responsive to identifying a plurality of trip-polylines that correspond with the reduced real-time location data of user;
determining the predicted path of the user to be the best matching trip-polyline of the plurality of trip-polylines that correspond with the reduced real-time location data of the user.

6. The method of claim 1, further comprising:
transmitting an alternate route to the user's mobile device if the at least one real-time obstacle is within the predicted path of the user.

7. The method of claim 1, further comprising buffering each of the plurality of trip-polylines by a predetermined radius.

8. A method of notifying a user of an obstacle in a predicted path of travel, the method comprising:
receiving real-time location data for a user from a user's mobile device, the real-time location data comprising a plurality of coordinates representative of a current path of travel by the user;
receiving a plurality of trip-polylines associated with the user, wherein each of the plurality of trip-polylines represents a previous path of travel by the user;
comparing the real-time location data to the plurality of trip-polylines to identify a trip-polyline that corresponds with the real-time location data of the user;
responsive to a trip-polyline not being identified that corresponds with the real-time location data of the user:
reducing the real-time location data by removing an oldest coordinate of the plurality of coordinates from the real-time location data of the user; and
if the reduced real-time location data comprises more than one coordinate;
comparing the reduced real-time location data to the plurality of trip-polylines to identify a trip-polyline that corresponds with the reduced real-time location data of the user;
responsive to a trip-polyline being identified that corresponds with the reduced real-time location data of the user, determining the identified trip-polyline to be a predicted path of the user; and
receiving an obstacle profile comprising coordinates related to at least one real-time obstacle;
determining if the at least one real-time obstacle is within the predicted path of the user by comparing the predicted path of the user to the coordinates of the at least one real-time obstacle; and transmitting a notification to the user's mobile device if the at least one real-time obstacle is within the predicted path of the user;

responsive to a trip-polyline not being identified that corresponds with the reduced real-time location data of the user:

further reducing the real-time location data by removing a next oldest coordinate of the plurality of coordinates from the real-time location data of the user and if the further reduced real-time location data comprises more than one coordinate repeating the step of comparing the reduced real-time location data of the user to the plurality of trip-polylines;

or, if the reduced real-time location data comprises a single coordinate;

determining a direction of travel of the user;

identifying an offset coordinate at a predetermined distance from the single coordinate in the direction of travel of the user;

radially buffering the offset coordinate at a predetermined radius to create a radial beacon;

comparing the radial beacon to the plurality of trip-polylines to identify a trip-polyline that corresponds with the radial beacon;

responsive to a trip-polyline being identified that corresponds with the radial beacon, determining the identified trip-polyline to be a predicted path of the user; and receiving an obstacle profile comprising coordinates related to at least one real-time obstacle;

determining if the at least one real-time obstacle is within the predicted path of the user by comparing the predicted path of the user to the coordinates of the at least one real-time obstacle; and transmitting a notification to the user's mobile device if the at least one real-time obstacle is within the predicted path of the user.

9. The method of claim 8, further comprising:
responsive to a trip-polyline being identified that corresponds with the real-time location data of the user, determining the identified trip-polyline to be a predicted path of the user; and receiving an obstacle profile comprising coordinates related to at least one real-time obstacle;

determining if the at least one real-time obstacle is within the predicted path of the user by comparing the predicted path of the user to the coordinates of the at least one real-time obstacle; and transmitting a notification to the user's mobile device if the at least one real-time obstacle is within the predicted path of the user.

10. The method of claim 8, wherein the obstacle is selected from the group consisting of delay points, delay polylines and delay polygons.

11. The method of claim 8, wherein the real-time location data is represented by a real-time polyline constructed using the plurality of coordinates in the real-time location data.

12. The method of claim 9, further comprising:
responsive to identifying a plurality of trip-polylines that correspond with the real-time location data of user;

determining the predicted path of the user to be the best matching trip-polyline of the plurality of trip-polylines that correspond with the real-time location data of the user.

13. The method of claim 8, further comprising:
responsive to identifying a plurality of trip-polylines that correspond with the reduced real-time location data of user;

determining the predicted path of the user to be the best matching trip-polyline of the plurality of trip-polylines that correspond with the reduced real-time location data of the user.

14. The method of claim 8, further comprising:
transmitting an alternate route to the user's mobile device if the at least one real-time obstacle is within the predicted path of the user.

15. The method of claim 8, further comprising:
buffering each of the plurality of trip-polylines by a predetermined radius.

* * * * *